Oct. 6, 1964 H. L. GORMLEY 3,151,509
WIRE STRIPPING TOOL HAVING BLADES WITH ALIGNING MEANS
Filed Sept. 26, 1961
FIG. 1.
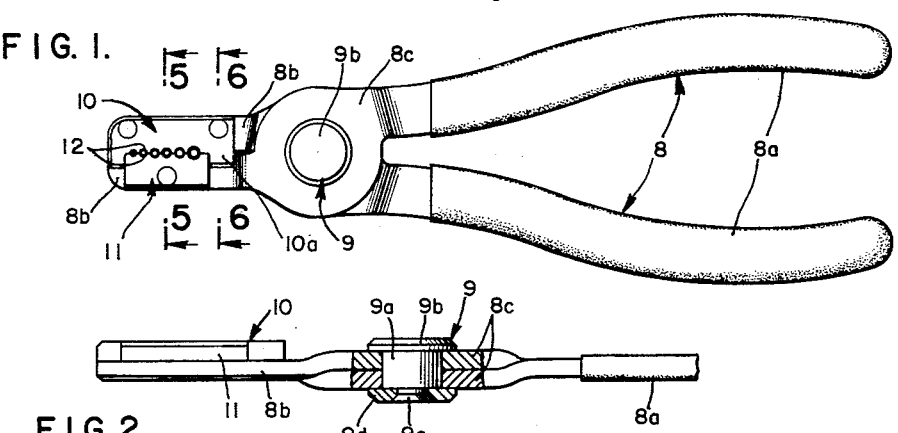
FIG. 2.
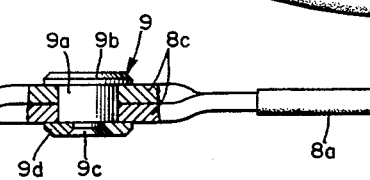
FIG. 3.
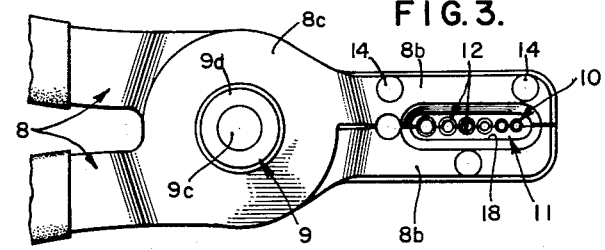
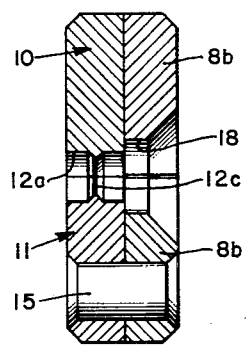
FIG. 5.
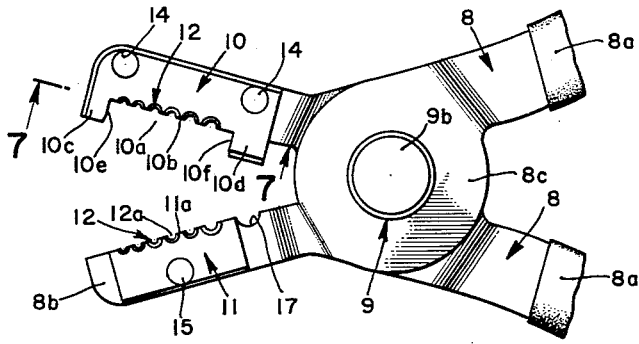
FIG. 4.
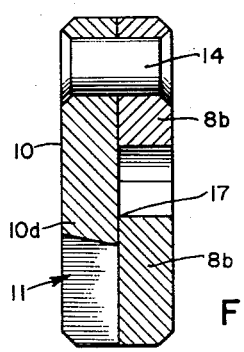
FIG. 6.
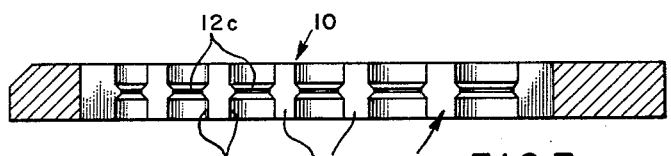
FIG. 7.
INVENTOR.
HARRY L. GORMLEY
BY Paul A. Weilein
ATTORNEY.

United States Patent Office 3,151,509
Patented Oct. 6, 1964

3,151,509
WIRE STRIPPING TOOL HAVING BLADES
WITH ALIGNING MEANS
Harry L. Gormley, 294 Dunas St., Orange, Calif.
Filed Sept. 26, 1961, Ser. No. 140,905
6 Claims. (Cl. 81—9.5)

This invention relates to a tool for stripping insulation from wires.

It is known that various forms of stripping tools are available for stripping insulation from wires. These tools, in most instances, are larger, heavier, of greater bulk and made up of a greater number of parts than, for example, ordinary pliers of small size. The newer types of these tools are equipped with spring-loaded handles and comparatively complicated mounting and operating means for the stripping jaws, thereby rendering the tools of considerable bulk and width at the jaw areas. Consequently, use of such tools in confined spaces is quite difficult and in some cases impossible.

Wire strippers as heretofore made, particularly the plier type wherein the stripping jaws are carried on crossed and pivotally connected handles, require frequent calibration, since in moving the jaws together to effect a stripping operation, the jaws must describe an arc, and slight wear of the cutting elements or slight play at the pivotal connection of the handles will cause misalignment of the cutting elements with resultant unreliable stripping action and possible nicking of the wires. Accordingly, frequent calibration of such cutting elements is required, and in some instances tools worn to the extent above noted are unfit for use and must be replaced.

It is an object of this invention to provide a plier-type wire stripping tool which constitutes an improvement over stripping tools heretofore made in point of comparatively small size and bulk, lightweight, simplicity of construction, reliability of performance without nicking, scraping or crushing the wires, and particularly the provision for efficient use of the tool in confined spaces.

It is another object to provide a wire stripping tool wherein the above objective is achieved by the manner in which opposed and comparatively small and narrow stripping jaws are constructed, as well as the manner in which they are disposed in a common plane on one side of both jaw supporting ends of crossed and pivoted handles of plier type, to the end that the entire jaw formation of the tool is comparatively thin and small for a convenient and reliable stripping operation in confined spaces.

More specifically, it is an object of this invention to provide a plier-type wire stripping tool such as described wherein novel means affords relative movement of the stripping jaws in a manner assuring that the complemental cutting elements on the jaws will be properly aligned when the jaws are brought together to perform a stripping operation, thereby making it unnecessary to frequently calibrate the jaws.

Contributing to the achievement of the objects of this invention is the novel construction and arrangement of elements of the tool wherein a pair of pivotally connected handles of generally strip form have comparatively thin jaw supporting ends disposed in edge-to-edge opposed relation in a common plane normal to the axis of the pivotal connection, for supporting on one side of both such ends and in edge-to-edge opposed relation in a common plane normal to the pivotal axis, a pair of plate-like stripping jaws having complemental cutting elements on opposed edges thereof. One of the jaws is mounted for limited movement relative to the other jaw and in such a manner incident to the jaws coming into contact with one another, that proper alignment of the cutting elements will take place each time the jaws contact one another preparatory to commencing a stripping operation. Moreover, the two jaws are formed to embrace one another and interlock before being moved into final stripping position and this assures that the proper alignment will be maintained with each stripping operation.

Other objects and advantages of the invention will be hereinafter described or will become apparent to those skilled in the art, and the novel features of the invention will be defined in the appended claims.

Referring to the drawing:

FIG. 1 is a side elevation of a wire stripper embodying the present invention;

FIG. 2 is a fragmentary bottom plan view partly in section of the tool shown in FIG. 1;

FIG. 3 is an enlarged fragmentary side elevation as seen from the side of the tool opposite that shown in FIG. 1;

FIG. 4 is an enlarged fragmentary side elevation of the tool as shown in FIG. 1, with the stripping jaws in open position;

FIG. 5 is a sectional view taken on the line 5—5 of FIG. 1 on an enlarged scale;

FIG. 6 is a sectional view taken on the line 6—6 of FIG. 1 on an enlarged scale; and FIG. 7 is an enlarged sectional view taken on the line 7—7 of FIG. 4.

A preferred form of wire stripper embodying the present invention as shown in the accompanying drawing generally comprises a pair of complemental and thin strip-like handles 8 that are crossed and pivotally connected by pivot means 9 to provide a pair of gripping portions 8a disposed in edge-to-edge opposed relation in a common plane normal to the pivotal axis of the handles, also a pair of relatively short plate-like end portions 8b disposed in edge-to-edge opposed relation in a common plane, likewise normal to the pivotal axis of the handles. These portions 8b support in edge-to-edge opposed relation in a common plane normal to the axis of the pivot 9, a pair of stripping jaws 10 and 11 having complemental cutting elements generally designated 12 on opposed edges thereof.

An important feature of this invention that affords an economy in production of the parts thereof as well as the advantage of the small size of the tool as a whole, is that the handles are made of suitable strong and rigid plate-like metal and are identical as to size and shape, each handle between its ends having a laterally offset and generally circular pivot portion 8c through the center of which the pivot means 9 extends. The offset pivot portions 8c abut one another on their concave faces as shown in FIG. 2 and this disposes the portions 8a and 8b of each handle in alignment, also disposes the two portions 8a and the two portions 8b in edge-to-edge opposed relation in a common plane.

The pivot means 9 as shown in FIG. 2 comprises a comparatively large diameter pivot pin 9a having an enlarged head 9b at one end and a reduced rivet portion 9c at the other end. This rivet portion is riveted in a counterbored retainer ring 9d to securely pivotally join the two handles in such a manner that wear and play at the pivot is minimized.

An important feature of this invention is that the stripping jaws 10 and 11 are constructed and arranged so that they will interlock preliminary to being moved into the position in which the complemental elements commence to cut into the insulation of wire to be stripped. This interlocking of the jaws will assure that the cutting elements will be properly aligned whereby the stripping action may take place without nicking, scratching or crushing the wire. Accordingly, the jaw 10 is formed so that in effect it is the female jaw, while the jaw 11 serves as a male jaw. Thus, the female jaw 10 is provided with a recess 10a opposite the male jaw 11 to define an edge 10b between projecting portions 10c and 10d, which latter define shoulders 10e and 10f.

The male jaw 11 is rectangular and of such length that it will fit closely into the recess 10a between the shoulders 10e and 10f with the edge 11a of the jaw 11 opposite and in contact with the edge 10b of jaw 10. When the jaws are interlocked in this manner, proper alignment thereof is assured.

The complemental cutting elements 12 are formed at spaced intervals along the opposed edges 10b and 11a of the jaws 10 and 11, respectively, and are of different sizes to provide for cutting wires of different diameters, for example, gauges 16 to 26.

As here shown, the edges 10b and 11a of the jaws 10 and 11 are formed with a series of semicircular counterbored recesses 12a of different sizes extending transversely across such edges. These recesses 12a are separated by lands 12b and the counterboring is effected in such a manner as to form upstanding semicircular and sharp cutting edges 12c of different sizes intermediate the ends of the transverse recesses 12a. With this arrangement, the recesses 12a will mate to define a series of circular openings 12d of different diameters between the lands 12b when the jaws are brought together, the cutting edges 12c also mating to form substantially continuous circular cutitng edges of different diameters which will cut circumferentially through the insulation on wires of predetermined gauge properly positioned between the jaws.

Means are provided for causing one of the jaws 10 and 11 to move relative to the other jaw in the event the jaws are not properly aligned. In such a case, this relative movement of the jaws will assure that the cutting elements 12 will be properly aligned for the desired accurate stripping action. Moreover, this means will positively prevent such relative movement of the jaws as would cause misalignment, each time the jaws are moved into contact with one another preliminary to being brought into final cutting or stripping position. For this purpose, as here shown, the female jaw 10 is immovably fixed in place as by means of a pair of rivets or similar fastenings 14. The male jaw 11, however, is mounted for limited pivotal movement about an axis normal to the plane in which the two jaws are disposed, there being a pivot pin 15 in the form of a single rivet to so mount the jaw 11. However, the pin 15 is set with a tightness causing the jaw 11 to be frictionally held against accidental or unintentional movement about the axis of the pivot, it being necessary for the ends of the jaw 11 to somewhat forcibly engage one or the other of the shoulders 10e and 10f on the jaw 10 to cause any angular movement of the jaw 11 about the axis of the pivot pin, this angular movement, of course, being very small in order to align the cutting elements.

The projection 10d on the female jaw 10 and an arcuate cutting edge 17 formed on the jaw supporting member 8b for the male jaw 11, serve as a convenient wire cutter, the outer edge of the projection 10d being ground to make a shear cut in cooperation with the edge 17.

The jaw supporting portions 8b on the faces thereof opposite the faces supporting the jaws 10 and 11 are recessed or relieved as at 18 to facilitate placement of the wires in position to be stripped, as well as to facilitate free movement of the stripped pieces of insulation from between the jaw supporting portions 8b during a stripping operation.

When the tool is manipulated as shown in FIG. 4 to spread the jaws 10 and 11, a wire to be stripped is positioned in the particular cutting recess 12a of a size corresponding to the gauge of the wire and the jaws are then brought together by appropriate manipulation of the handle portions 8a. When the male jaw 11 enters the recess 10a in the female jaw and the male jaw happens to be so angularly related to jaw 10 that the cutting elements 12 will not align, one end or the other of the male jaw will encounter one or the other of the shoulders 10e and 10f, depending upon the particular angular position of the jaw 11 at the time the jaw enters the recess. This engagement of the male jaw 11 with one or the other of the shoulders 10e and 10f will cause such angular movement of the jaw about the axis of the pivot 9 as required to align the cutting recesses 12a in the jaw 11 with the cutting recesses 12a in the jaw 10 and thereby assure that at the time these recesses match, the cutting edges 12c will also coact to cut circumferentially through the insulation on the wire without nicking, scratching or crushing the wire. Each time the male jaw 11 enters the recess in the female jaw 10 so that the ends of the male jaw are opposite the shoulders 10e and 10f, the jaws are held in proper alignment. The lands 12b act as stops to limit movement of the jaws and thus insure proper depth of cut through the insulation. After the jaws are brought together to cut through the insulation, the tool is moved toward the end of the wire to strip the insulation from that end in the usual manner.

It should be noted that the construction of the jaws and jaw supporting portions of the handles is such that the jaw area of the tool is of comparatively small size and capable of being efficiently operated in confined spaces. Moreover, the tool readily lends itself to the desired precision machining and mounting of the jaws in such a manner that in combination with the self-aligning action provided in the tool, accurate stripping may be accomplished without nicking, scratching or crushing the wire.

While specific structural details have been shown and described, it should be understood that changes and alterations may be resorted to without departing from the spirit of the invention as defined in the appended claims.

I claim:

1. A wire stripping tool comprising: a pair of wire stripping jaws having complemental cutting elements thereon; means supporting said jaws in opposed relation to one another and operable for moving said jaws into and from a position in which said cutting elements are cooperable to cut through the insulation on wire to be stripped; means pivotally mounting one of said jaws with respect to said supporting means; and means on said jaws, separate from said cutting elements, arranged to engage one another and move said one jaw about its pivot to align the cutting elements thereon with the cutting elements on the other jaw preliminary to movement of said jaws into said cutting positions.

2. A wire stripping tool comprising: a pair of pivotally connected handles having jaw supporting portions at corresponding ends movable toward and away from one another upon manipulation of said handles; jaw means on one of said jaw supporting portions; jaw means on the other jaw supporting portion; said two jaw means being opposite one another in a common plane on one side of both of said jaw supporting portions; complementary cutting elements spaced along opposed portions of said jaw means; means mounting one of said jaw means for movement relative to the jaw supporting portion therefor; and means on said two jaw means spaced from said cutting element and mutually engageable to effect movement of one of said jaw means relative to the jaw supporting portion therefor to align the complementary cutting elements on said two jaw means.

3. A wire stripping tool comprising: a pair of pivotally connected handles having jaw supporting portions movable toward and away from one another upon manipulation of said handles; a female jaw on one of said jaw supporting portions and having a recess therein; a male jaw on the other of said jaw supporting portions and adapted to enter said recess; said jaws having opposed edges; complemental cutting elements on said edges; and means mounting one of said jaws for pivotal movement relative to the other jaw to align said cutting elements in response to said male jaw being moved into said recess in said female jaw.

4. A wire stripping tool comprising: a pair of pivotally connected handles having jaw supporting portions movable toward and away from one another upon manipulation of said handles; a jaw immovably fixed to one of said portions; a second jaw on the other of said portions; said jaws having opposed elongate edges disposed on one side of both of said portions; a plurality of complemental cutting elements spaced along said edges; said jaws having at the ends of sad edges means which contact one another upon movement of said jaws toward one another; and pivot means mounting said second jaw for movement relative to the jaw supporting portion therefor and said immovably fixed jaw in response to said jaws contacting one another, to thereby bring said complemental cutting elements into alignment.

5. A wire stripping tool comprising: a pair of pivotally connected handles having opposed end portions disposed in a common plane normal to the axis of said pivotal connection and movable toward and away from one another upon movement of said handle about said pivotal connection; a pair of plate-like jaws on said end portions; said jaws being opposite one another in a common plane normal to said axis and to one side of both end portions; said jaws having opposed edges; complemental cutting elements on said edges cooperable to cut through insulation on wires upon moving said jaws together with said edges contacting one another; projections on one of said jaws for contacting portions of the other of said jaws upon moving said end portions to move said jaws toward one another; and means providing a pivot axis for said other jaw normal to the plane in which said jaws are disposed and about which said other jaw is movable in response to said projections contacting with said other jaw.

6. A wire stripping tool comprising: a pair of elongate jaws; one of said jaws having between its ends a recess defining an edge extending longitudinally of the jaw and also defining projections at the end of said jaw; the other of said jaws having a length substantially equal to that of said edge of said one jaw and being adapted to be moved between said projections into and from said recess; said other jaw having a longitudinal edge adapted to abut said edge of said one jaw; said edges of said jaws having complemental cutting elements thereon; means supporting said jaws operable to move said other jaw into and from a position in said recess in which the cutting elements on said other jaw are cooperable with cutting elements on said one jaw to cut through insulation on wire to be stripped; and said means supporting said jaws including means affording angular movement of said other body about an axis on said supporting means upon movement of said other body into said recess.

References Cited in the file of this patent

UNITED STATES PATENTS

| | | |
|---|---|---|
| 608,919 | Sell | Aug. 9, 1898 |
| 787,710 | White | Apr. 18, 1905 |
| 880,790 | Goehst | Mar. 3, 1908 |
| 1,306,588 | France | June 10, 1919 |
| 1,388,398 | Adams | Aug. 23, 1921 |
| 2,316,869 | Jabour | Apr. 20, 1943 |
| 2,383,479 | Gordon | Aug. 28, 1945 |
| 2,451,463 | Zimmermann | Oct. 19, 1948 |
| 2,585,080 | Beaulieu et al. | Feb. 12, 1952 |
| 2,774,130 | Folkenroth | Dec. 18, 1956 |
| 2,778,255 | Miller | Jan. 22, 1957 |
| 2,844,056 | Sladek | June 22, 1958 |
| 2,848,810 | Wendt | Aug. 26, 1958 |
| 2,853,908 | Logan | Sept. 30, 1958 |
| 2,884,823 | Scott | May 5, 1959 |
| 2,932,224 | Peed et al. | Apr. 12, 1960 |

FOREIGN PATENTS

| | | |
|---|---|---|
| 633,230 | France | Oct. 22, 1927 |
| 20,231 | Norway | Jan. 27, 1910 |